United States Patent [19]

Kuster et al.

[11] Patent Number: 4,976,766

[45] Date of Patent: Dec. 11, 1990

[54] DEVICE FOR POSITIONING HEATED GLASS SHEETS WITHOUT DEFORMATION

[75] Inventors: Hans-Werner Kuster, Aachen, Fed. Rep. of Germany; Luc Vanaschen, Eupen, Belgium

[73] Assignee: Saint-Gobain Vitrage International, Courbevoie, France

[21] Appl. No.: 431,786

[22] Filed: Nov. 6, 1989

[30] Foreign Application Priority Data

Nov. 4, 1988 [DE] Fed. Rep. of Germany ....... 3837471

[51] Int. Cl.$^5$ ............................................. C03B 23/02
[52] U.S. Cl. ....................................... 65/289; 65/163; 65/245; 198/411; 198/434
[58] Field of Search ................. 65/104, 106, 107, 165, 65/245, 163, 287–291; 198/411, 434

[56] References Cited

U.S. PATENT DOCUMENTS

| | | | |
|---|---|---|---|
| 3,307,930 | 3/1967 | Stevens et al. | 65/290 X |
| 3,992,182 | 11/1976 | Frank | 65/163 |
| 4,058,200 | 11/1977 | Frank | 198/411 X |
| 4,387,890 | 6/1983 | Lampe | 198/411 X |
| 4,499,990 | 2/1985 | Fishback | 198/411 |
| 4,802,904 | 2/1989 | Boutier et al. | 65/106 |
| 4,838,920 | 6/1989 | Gonzales et al. | 65/104 |

*Primary Examiner*—Robert L. Lindsay
*Attorney, Agent, or Firm*—Oblon, Spivak, McClelland, Maier & Neustadt

[57] ABSTRACT

In a substantially horizontal conveyor or conveying heated glass sheets, a positioning device for aligning the sheets in a direction transverse to the conveying direction. It includes thrust rods advanced by the engagement of cam followers moving with the thrust rod on cams stationary with respect to the conveyor. Draw springs return the thrust rods to their initial position. The thrust rods are mounted on crosswise carriages, which are in turn mounted on carriages movable in the conveying direction and in synchronism with the glass sheets. The thrust rods are pivotally mounted on the crosswise carriages about horizontal axes, and so their distal ends can be displaced out of the plane of the glass sheets during the return movement of the carriage.

13 Claims, 3 Drawing Sheets

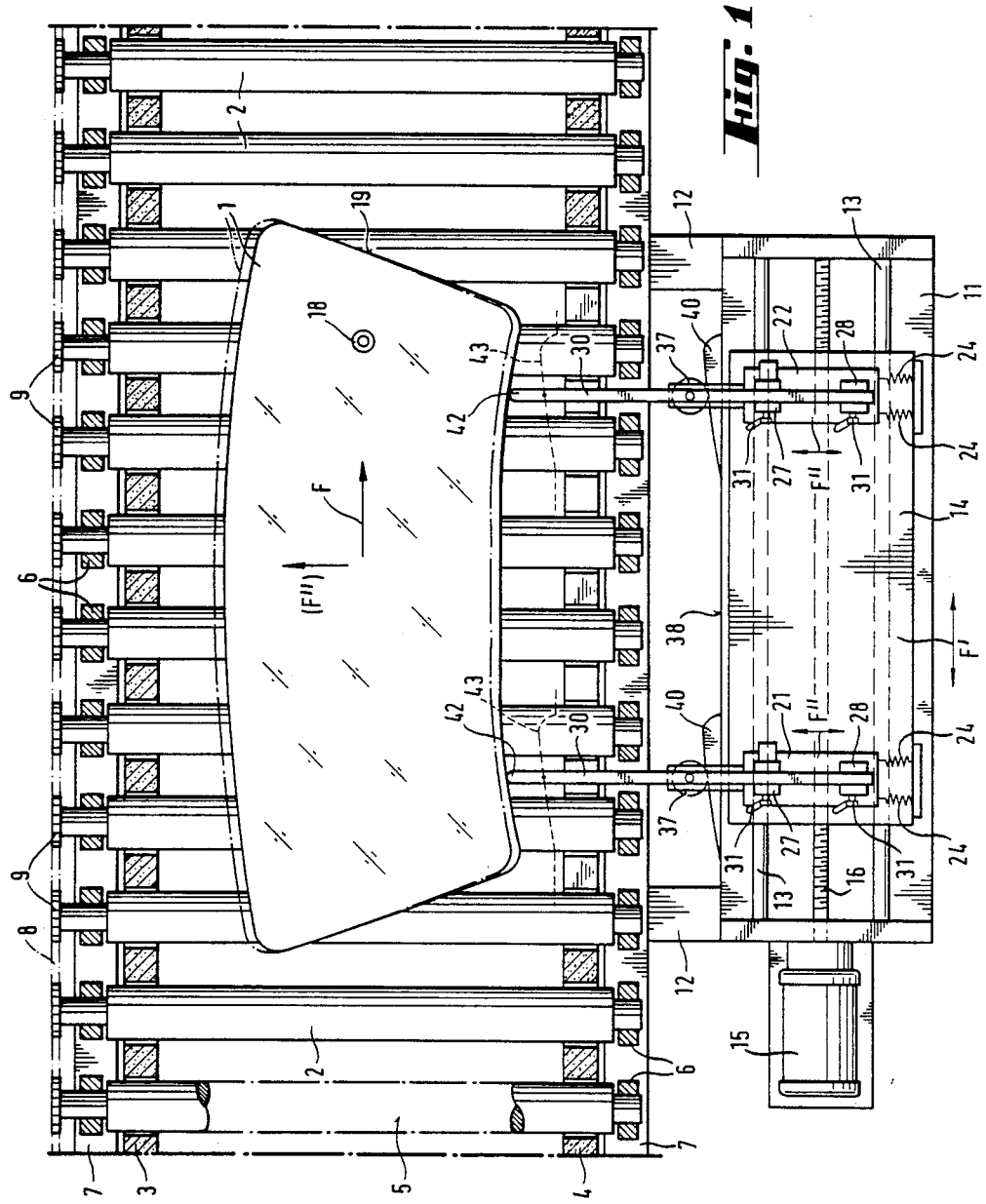

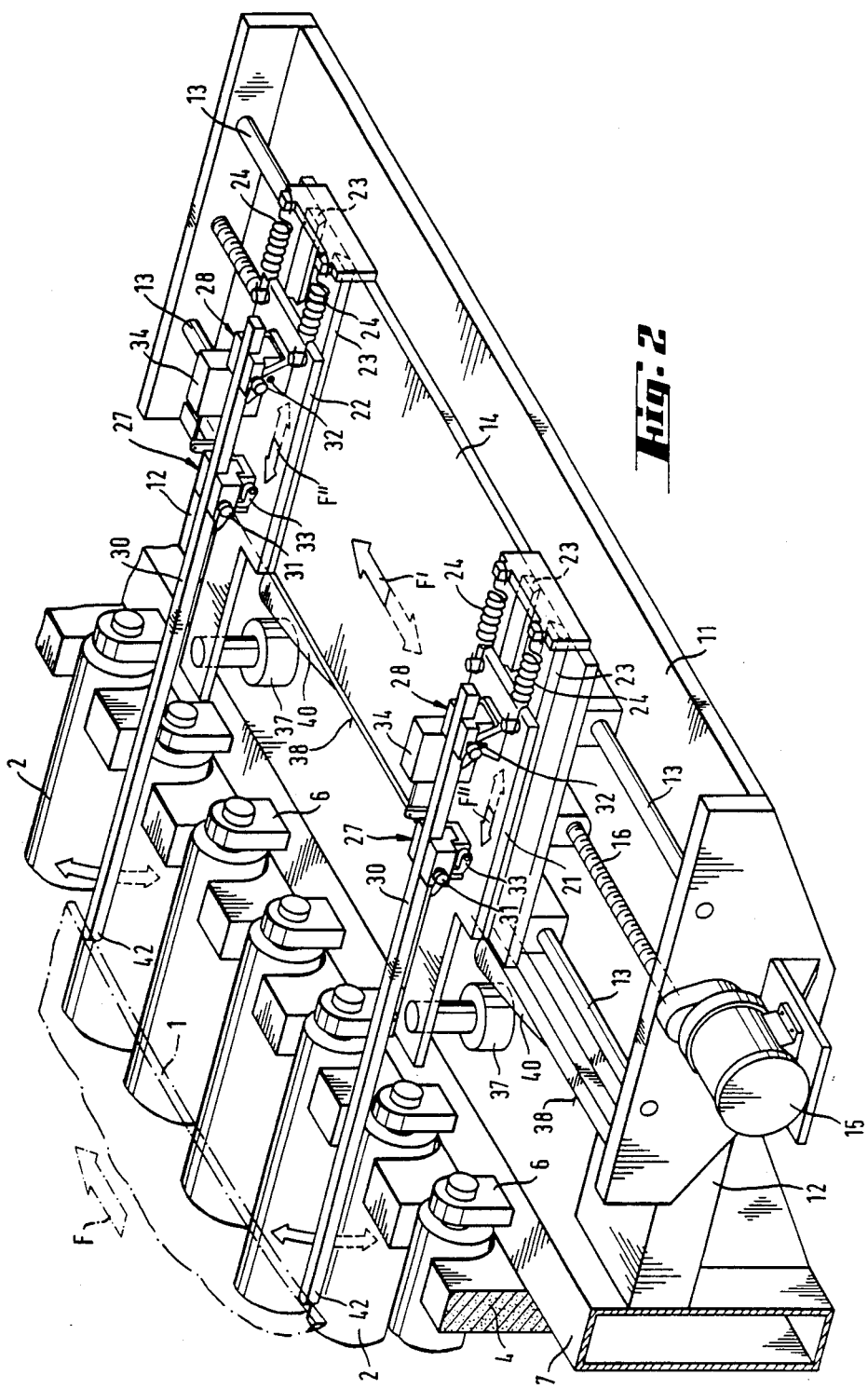

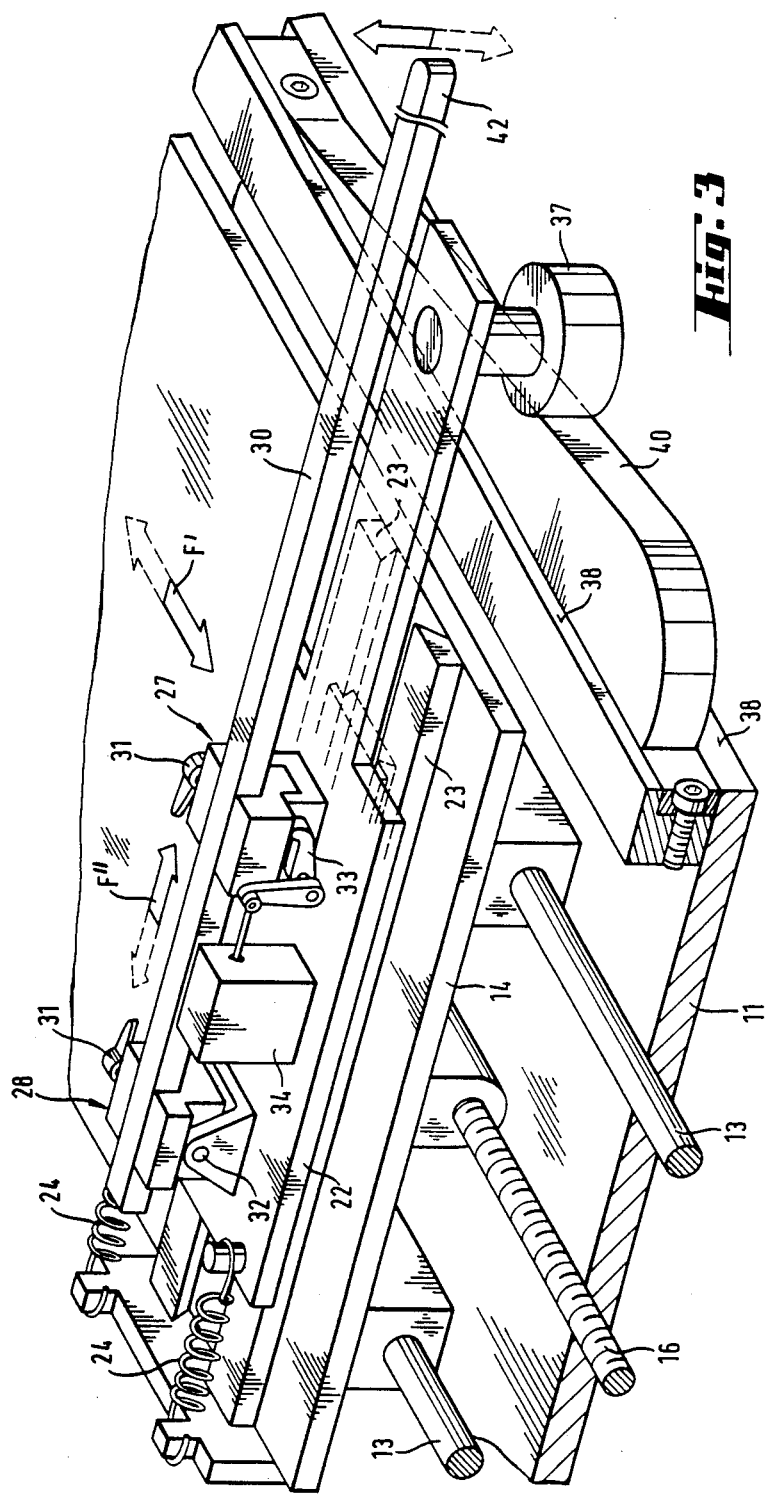

DEVICE FOR POSITIONING HEATED GLASS SHEETS WITHOUT DEFORMATION

BACKGROUND OF THE INVENTION

1. Field of the Invention

This invention relates to a device for positioning glass sheets advancing flat on a conveyor and, particularly, glass sheets heated beyond their softening temperature, in preparation for their bending. It applies, for example, to the production of automobile glazings.

2. Discussion of the Related Art

A correct positioning, or more precisely a correct orientation, of glass sheets on a horizontal conveyor is systematically necessary since the latter must occupy a predetermined position in a treatment station. Ordinarily, to bring the glass sheets to the desired position, alignment devices are used which act on the edges of the glass sheets with the help of spindles or pins.

The alignment of the glazings is not very difficult when these glazings are at ambient temperature, which is the case, for example, during the cutting or polishing of the edges. But when these glazings are heated beyond the softening temperature, for example immediately before a bending station or inside it, the pins or spindles acting on their edges cause local deformations which harm the optical properties of the glazing. It is possible to avoid any alignment in the longitudinal direction of the conveyor by determining with an edge detector operating without contact, for example one of the photoelectric barrier type, the moment when the edge of a glass sheet passes a given point selected on the conveying path and by calculating on the basis of this time signal the moment when, considering the speed of the conveyor, the glazing will reach its final position in the longitudinal direction and therefore when the rollers of the conveyor will have to be immobilized. However, the positioning of the glass sheets in relation to the crosswise direction of the conveyor cannot be avoided and for this purpose it is necessary to displace them with push pins or rods which act on their edges.

A positioning device is known from U.S. Pat. No. 3,701,643, comprising a carriage which is positioned laterally beside the horizontal conveyor, and moved parallel to it and in synchronism with the glass sheet. On this carriage is mounted at least one thrust rod which is mobile to a predefined extent, advancing transverse to the direction of displacement of the carriage, and acting on a lateral edge of the glass sheet. According to said document, the thrust rods are actuated by pneumatic cylinders whose piston rods have paths limited at both stroke ends by stops, of which the front stop is mounted in a place corresponding to the desired position of the glazing.

With this known positioning device, the action of the thrust rods on the lateral edges of the glass sheets is an intermittent or jerking action. Therefore, there is a danger that the softened glass sheet will be locally deformed by the contact with jerking.

SUMMARY OF THE INVENTION

The present invention has as an object the making of a device for positioning the heated glass sheet on a conveyor and in a direction transverse to the conveying direction without distorting the glass sheet.

It is a further object of the present invention to provide a substantially horizontal conveyor for conveying sheet like bodies in a conveying direction and for aligning the sheet like bodies in a direction substantially transverse to the conveying direction without jerkiness and in any desired path/time function.

The above, and other, objects are achieved according to the present invention by a substantially horizontal conveyor for conveying sheet like bodies in a conveying direction and having a positioning device for aligning the sheet like bodies in a direction substantially transverse to the conveying direction, in which the positioning device includes a carriage positioned laterally of the conveyor, means for moving the carriage in the conveying direction and in synchronism with a sheet like body on the conveyor, at least one thrust rod mounted on the carriage for movement in the transverse direction so that the thrust rods can be advanced into contact with the sheet like body on the conveyor, and means for selectively advancing each thrust rod into contact with the sheet like body. The means for selectively advancing includes a cam mounted stationarily with respect to one of the thrust rod and the conveyor, and a cam follower mounted stationary with respect to the other of the thrust rod and the conveyor, the cam and cam follower being mutually positioned such that the cam and the cam follower are engaged during movement of the carriage in the conveying direction, by which the thrust rod is advanced into contact with the sheet like body.

Using the device according to the invention, it is possible in a simple manner to make an optimal travel of the thrust rod. This travel can, for example, be such that the thrust rod head approaches the edge of the glazing at a very low speed and, after having reached its desired end-of-travel position, comes relatively quickly back into its starting position.

The cam can have any shape including that of a guide slide of the oblong opening type, in which a drive pin is engaged so that the return of the thrust rod to its starting position is also guided by this guide slide. It is also possible to provide a cam which assures only the forward displacement and to act so that the thrust rod is returned to its starting position by draw springs or pneumatic cylinders.

The thrust rod can be mounted as such a slide. In this case, a drive roller is mounted directly on the thrust rod. Also, the draw springs then act directly on the thrust rod.

According to another, more specially preferred embodiment, the thrust rod is mounted on a crosswise carriage which can slide in the extent necessary on the carriage. The drive roller and, if applicable, the draw springs are in this case mounted on the crosswise carriage. This arrangement exhibits the advantage of making it possible to modify the position of the thrust rod on the crosswise carriage so that the active length of the thrust rod can be adapted to the conditions encountered.

According to another advantageous embodiment, the thrust rod is mounted to pivot about a horizontal axis and is provided with a selective displacing means controlled so that the thrust rod, after the alignment operation, pivots upward by a small angle so that its distal end is then located above the level of the glass sheet. Thus, the thrust rod cannot come in contact with the sheet during the return of the carriage, even if the glass sheet exhibits curved longitudinal edges.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a plan view of a positioning station according to the invention,

FIG. 2 is a view in perspective of the positioning device itself represented in FIG. 1, and FIG. 3 is a view, in larger scale, of a detail of FIG. 2.

DETAILED DESCRIPTION OF THE PREFERRED EMBODIMENTS

As shown in FIG. 1, glass sheet 1 is moved, in the direction of arrow F', on a horizontal conveyor made of conveyor rollers 2, at a speed that is regulated as a function of the nature of the treatment station (not shown), which can for example be a bending station. The horizontal conveyor is installed in a heating furnace. Conveyor rollers 2, at both their ends, pass through lateral walls 3 and 4 of the furnace, of the so-called tunnel type which is closed on its lower face by bottom 5. Conveyor rollers 2 are supported on the outside of the lateral walls of the furnace in bearings 6 mounted on support beams 7. Conveyor rollers 2 are driven together by a drive chain 8 which meshes with toothed wheels 9 mounted on the rollers 2.

On a lateral side of the furnace is provided a horizontal support plate 11 that is mounted rigidly by brackets 12 to the frame of the conveyor. On support plate 11 are installed rails 13 extending parallel to the longitudinal direction of the conveyor, on which a carriage 14 can be displaced in the direction of arrow F' in synchronism with glass sheet 1 and parallel to it. Driving of carriage 14 is performed by threaded rod 16 driven by motor 15 and fitted in a threaded bore of the carriage. Motor 15 is connected electrically to the mechanism for driving conveyor rollers 2 by control means provided such so that carriage 14 is displaced in the direction of arrow F', i.e., in the direction of conveying of glass sheet 1 and at the same speed as the latter. The control means are not shown and may be of any desired type. As a nonlimiting example it may be a programmable general purpose computer. A sensor 18 is provided at a suitable place above the conveyor rollers to trigger drive motor 15 via the control means. It can, for example, be a pneumatic or photoelectric sensor which emits a control signal to the control means upon the passage of front edge 19 of sheet 1. Carriage 14 starts at the moment the glazing is precisely aligned with its position and travels in synchronism with the glazing by a distance determined as a function of what is necessary for the alignment of the glass sheet in view of the amount of its disorientation, as is shown in FIG. 1.

Carriage 14 supports two crosswise carriages 21, 22 oriented perpendicular to rails 13. These crosswise carriages can be displaced in a transverse or crosswise direction on slides 23. On these crosswise carriages 21 and 22 are mounted supports 27 and 28 respectively inside each of which is installed a thrust rod 30. Thrust rods 30 are locked in the desired position by thumb screws 31.

Support 28 located on the side of crosswise carriage 21 or 22 farthest from the conveyor is mounted to pivot around a pin 32 that can be seen in FIGS. 2 and 3, while support 27, located on the side of the crosswise carriage closest to the conveyor, is mounted so as to be able to be displaced to a certain extent in a vertical direction along an arc centered on pin 32. In this way, end 42 of thrust rod 30 can perform a pivoting movement in a vertical direction. The pivoting movement is caused by pivoting of a lever 33 which is displaced between two end positions by, for example, the rod of an electromagnetic solenoid 34.

A drive roller 37 is mounted on each of crosswise carriages 21 and 22, on the side near the conveyor, while draw springs 24 are connected to the opposite side of crosswise carriages 21 and 22, the other end of the springs being fastened to longitudinal carriage 14. The draw springs 24 hold crosswise carriages 21, 22 in a position determined by the position occupied by drive roller 37.

In the starting position of longitudinal carriage 14, drive rollers 37 are applied against lateral delimitation surface 38 of support plate 11 and the thrust rods are retracted. Cams 40 are releasably fastened at suitable places to this delimitation surface 38, e.g. by bolts. During the displacement of longitudinal carriage 14, drive rollers 37 arrive on cams 40 and are advanced by cams 40 in the direction of double arrow F''. Cams 40 have a shape such that they rise in a gentle slope, i.e., at a small angle, relative to the direction of displacement of glass sheet 1. In this way, distal ends 42 of thrust rods 30 approach the edge of glazing 1 slowly each time according to the curves in broken lines 43, so that jerky contact with the edge of the glazing is avoided. The final desired position of distal end 42 of thrust rod 30 is determined by the highest point of cam 40. When this highest point is reached, the curve of cam 40 falls suddenly and thrust rod 30 is thereby quickly retracted to its starting position by draw springs 24.

As soon as drive rollers 37 leave cams 40 during the synchronous displacement of longitudinal carriage 14, or if necessary shortly thereafter, the return movement of longitudinal carriage 14 is begun by the control means. This return movement can be done, for example, by reversing the motor 15 after the detection of a predetermined number of rotations of the threaded rod 16, or of a predetermined period of time, by the control means. Since the lateral edge of glass sheet 1 on which thrust rods 30 acts is not normally straight but curved, it is necessary to provide that thrust rods 30 do not again come in contact with the edge of the glass sheet during the return of longitudinal carriage 14. This is achieved by selective displacing means for the pivoting movement of thrust rods 30 around pivot pin 32, the angle of this pivoting movement being relatively small and being sufficient to displace distal ends 42 of thrust rods 30 upward to a displaced position above the plane determined by the upper surface of glazing 1. When drive motor 15 receives the command pulse from the control means for return of carriage 14, solenoid 34 simultaneously receives a command pulse from the control means by which lever 33 is actuated to cause thrust rod 30 to pivot upward. For example, the solenoid rod is caused to retract and pivot the lever in a counterclockwise direction as seen in FIG. 3. When carriage 14 is returned to its starting position, lever 33 is also brought back to its starting position (rotated in a clockwise direction) so that the thrust rods are returned to the height of the edge of the glass sheet.

Preferably, cams 40 are mounted so as to be able to be replaced on support plate 11 with cams exhibiting a different profile when that is appropriate. In addition, by laterally bending thrust rods 30, it is possible to modify the point of application of these rods to the edge of glass sheets 1, for example for other shapes of glazings.

In the case shown, the displacements of the two thrust rods 30 are synchronous. However, in some cases, it is advantageous to act so that the displacements of the thrust rods can be consecutive in time. This can be achieved in a simple manner by the mounting of different cams 40 or by the modification of the position of a cam 40 on fastening surface 38. Also, depending on the shape of the glazings, both thrust rods 30 can be fastened in different positions on carriages 21, when for example the lateral edges of the glazings advance obliquely in relation to the conveying direction.

Of course, any other design details, which are not essential for the invention, can be made in any appropriate manner.

What is claimed as new and desired to be secured by letters patent of the United States is:

1. In a substantially horizontal conveyor for conveying heated glass sheet like bodies in a conveying direction, a positioning device for aligning said sheet like bodies in a direction substantially transverse to the conveying direction, comprising:
   a carriage positioned laterally of the conveyor;
   means for moving said carriage in the conveying direction and in synchronism with a sheet like body on the conveyor;
   at least one thrust rod mounted on said carriage for movement in said transverse direction, whereby said at least one thrust rod is advanced into contact the sheet like body on the conveyor; and
   means for selectively advancing each said thrust rod into contact with said sheet like body, including:
   (a) a cam mounted stationarily with respect to said conveyor, and
   (b) a cam follower mounted with respect to said conveyor for movement in the conveying direction together with said thrust rod, said cam follower being mutually positioned such that said cam and said cam follower are engaged during movement of said carriage in said conveying direction, whereby said at least one thrust rod is advanced and aligns said sheet like body.

2. The conveyor of claim 1 wherein said cam is shaped with a gradual slope for advancing said thrust rod, whereby said thrust rod gently contacts the sheet like body.

3. The conveyor of claim 2 including means for selectively displacing said thrust rod such that said thrust rod remains out of contact with said sheet like body when said thrust rod is advanced.

4. The conveyor of claim 3 including means for biasing said at least one thrust rod into a retracted position thereof.

5. The conveyor of claim 1 including a bending device positioned downstream of said conveyor for bending the aligned heated glass sheets.

6. The conveyor of claim 1 wherein said cam follower is a roller.

7. The conveyor of claim 1 wherein said at least one thrust rod comprises two thrust rods spaced from one another in the conveying direction, each said thrust rod being mounted on said carriage via crosswise carriages mounted on said carriage for movement in the transverse direction.

8. The conveyor of claim 7 wherein said biasing means comprise draw springs extending between said carriage and said crosswise carriages.

9. The conveyor of claim 7 wherein said means for selectively displacing comprise:
   means for pivotally mounting each said thrust rod on one of said crosswise carriages for pivoting said thrust rod about a horizontal axis to a displaced position wherein a distal end of said thrust rod is out of the plane of the glass sheets on the conveyor; and
   means for selectively pivoting said thrust rod.

10. The conveyor of claim 9 wherein said means for selectively pivoting comprise a solenoid having a solenoid rod connected to a pivot shaft of said thrust rod.

11. The conveyor of claim 5 wherein said cams are releasably mounted with respect to said conveyor, whereby they may be replaced with cams having different shapes.

12. The conveyor of claim 7 wherein said cams are mounted such that said thrust rods are advanced simultaneously.

13. The conveyor of claim 7 wherein said cams are mounted such that said thrust rods are advanced consecutively.

* * * * *